(12) United States Patent  
White et al.

(10) Patent No.: US 6,247,633 B1
(45) Date of Patent: Jun. 19, 2001

(54) FABRICATING LOW DISTORTION LAP WELD CONSTRUCTION

(75) Inventors: Dawn Roberta White, Ann Arbor; Susan Marie Ward, Dearborn; Alvin Kenneth Oros, Farmington Hills, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/262,734

(22) Filed: Mar. 2, 1999

(51) Int. Cl.[7] ................................................. B23K 20/12
(52) U.S. Cl. ............................................ 228/112.1; 228/2.1
(58) Field of Search ................................... 228/2.1, 112.1

(56) References Cited

U.S. PATENT DOCUMENTS

| | | |
|---|---|---|
| 5,460,317 | 10/1995 | Thomas et al. . |
| 5,558,407 | 9/1996 | Jaskiery . |
| 5,697,511 | 12/1997 | Bampton . |
| 5,697,544 * | 12/1997 | Wykes ..................................... 228/2.1 |
| 5,713,507 | 2/1998 | Holt et al. . |
| 5,718,366 * | 2/1998 | Colligan ............................. 228/112.1 |
| 5,769,306 * | 6/1998 | Colligan ............................. 228/112.1 |
| 5,813,592 * | 9/1998 | Midling et al. .................... 228/112.1 |
| 5,862,975 * | 1/1999 | Childress ................................ 228/120 |
| 5,971,247 * | 10/1999 | Gentry ..................................... 228/2.1 |
| 6,029,879 * | 2/2000 | Cocks .................................... 228/2.1 |
| 6,045,027 * | 4/2000 | Rosen et al. ....................... 228/112.1 |
| 6,045,028 * | 4/2000 | Martin et al. ...................... 228/112.1 |
| 6,050,474 * | 4/2000 | Aota et al. ......................... 228/112.1 |
| 6,050,475 * | 4/2000 | Kinton et al. ...................... 228/112.1 |
| 6,051,325 * | 4/2000 | Talwar et al. ......................... 428/593 |

FOREIGN PATENT DOCUMENTS

| | | |
|---|---|---|
| 10071478A * | 3/1998 | (JP) . |
| 11081656A * | 3/1999 | (JP) . |
| 968788A2 * | 5/2000 | (JP) . |

* cited by examiner

Primary Examiner—Tom Dunn
Assistant Examiner—Kiley Stoner
(74) Attorney, Agent, or Firm—Joseph W. Malleck

(57) ABSTRACT

A method of making a low distortion frame construction, the construction having joint regions formed by first and second overlapping members defining a lapped interface, the joint regions being comprised of material that can be converted to a solid state deformable plastic condition by friction heat, comprising: (a) providing a stir friction welding tool having (i) a rotatable thermally conductive body presenting a shoulder to engage the joint region for storing friction-generated heat, and (ii) a friction generating pin rotatable with said body about a pin axis and selectively extendable from the shoulder to progressively penetrate the overlapping members as the joint region in contact with the pin becomes plastic; (b) placing the tool shoulder against the joint region with the pin axis transverse to the lapped interface and spinning the body while progressively extending the pin at a rotational speed effective to generate friction heat that converts the adjacent material of the joint to a plastic condition allowing the spinning of the probe to stir such plastically converted material; and (c) controlling the depth of penetration of the spinning probe while translating the tool across the joint region to perfect a friction stirred welded zone that extends through the interface and between the overlapping members to provide a welded joint that is exceptionally strong in shear.

3 Claims, 2 Drawing Sheets

FABRICATING LOW DISTORTION LAP WELD CONSTRUCTION

TECHNICAL FIELD

This invention relates to friction stir welding, and more particularly to a method for creating welded lapped joints using a rotating pin for friction stir welding.

DESCRIPTION OF THE PRIOR ART

Heretofore, friction stir welding has been used to join members at seams that are not overlapped, due to the anticipated limitation of pin extension that is needed to stir the joint material. To ensure a sound butt weld, the depth of pin penetration had to be controlled within a very close tolerance, such as within 0.002 inches of the bottom of the faying surface to ensure a sound weld, and the thickness of the joint had to be constant for the weld tool to work properly.

In an attempt to extend stir welding to lapped joints, the prior art used through-blade penetration that reciprocatingly cut through both members of a lapped joint leaving a thin line of stirred material which was not strong in shear. Such through-penetration is disadvantageous because it does not provide for effective stirring of the material utilizing reciprocation of a blade tool rather than a rotary tool.

As a result, the accepted state of the art for lapped joints continues to use arc welding which, unfortunately, results in high distortion and low strength for lapped joint construction.

SUMMARY OF THE INVENTION

It is an object of this invention to provide a method that enables friction stir welding to be used for lapped joints and thereby provide a low distortion construction which is strong in shear.

A first aspect of the invention that meets the above object is a method of making a low distortion frame construction, the construction having joint regions formed by first and second overlapping members defining a lapped interface, the joint regions being comprised of material that can be converted to a solid state deformable plastic condition by friction heat, comprising: (a) providing a stir friction welding tool having (i) a rotatable thermally conductive body presenting a shoulder to engage the joint region for storing friction-generated heat, and (ii) a friction generating pin rotatable with said body about a pin axis and selectively extendable from the shoulder to progressively penetrate the overlapping members as the joint region in contact with the pin becomes plastic; (b) placing the tool shoulder against the joint region with the pin axis transverse to the lapped interface and spinning the body while progressively extending the pin at a rotational speed effective to generate friction heat that converts the adjacent material of the joint to a plastic condition allowing the spinning of the probe to stir such plastically converted material; and (c) controlling the depth of penetration of the spinning probe while translating the tool across the joint region to perfect a friction stirred welded zone that extends through the interface and between the overlapping members to provide a welded joint that is exceptionally strong in shear.

The interface can be flat or curved such as in lap welding of extruded or hydroformed hollow struts with cast aluminum nodes that fit within the ends of the struts. Preferably, the lapped joint material is aluminum or magnesium alloys, but can be ferrous materials or any material that can be converted to a solid state deformable plastic condition.

DETAILED DESCRIPTION AND BEST MODE

Figure 1:
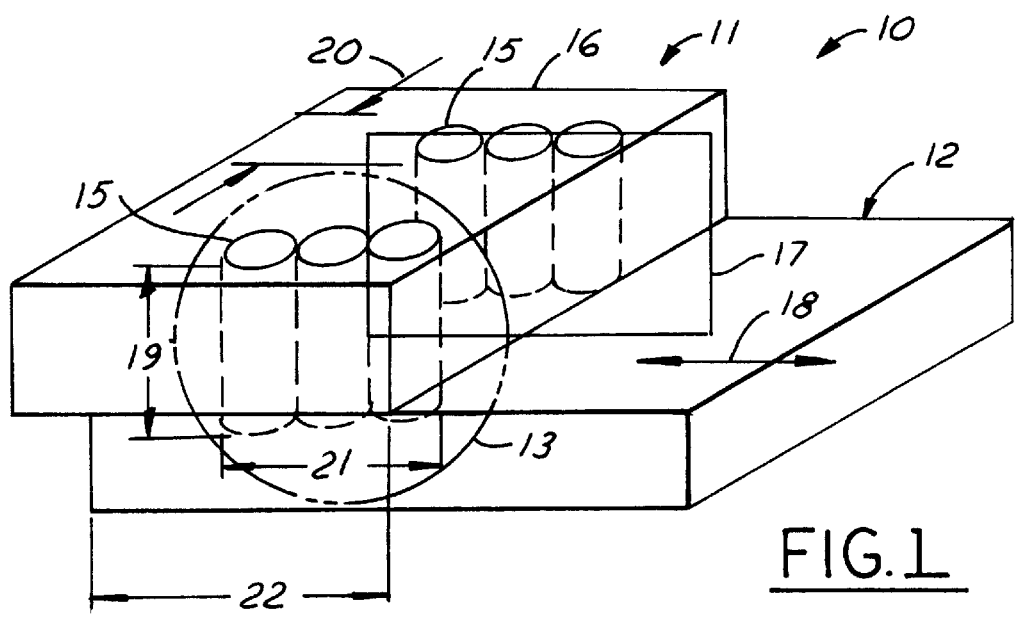
FIG. 1 is a perspective view of a lap joint showing typical friction stir welds that provide a strong shear joint in accordance with this invention.

As shown in FIG. 1, a lap joint 10 has been welded by friction stir welding applied in accordance with this invention. The joint 10 comprises a first member 11 and a second member 12 with one sitting on top of the other to define a lapped region 13 and an intercontacting interface 14. The members are comprised advantageously of aluminum but can be any metal that can be converted to a plastic state by friction heating using a relatively small rotating pin. The weld consists of one or more channels 15 of member material that has been friction stirred and extends at least through the interface 14 generally perpendicular to the exposed surface 16 of one of the members. A midplane 17 that extends through the channels is aligned generally to the primary direction 18 of anticipated shear for the joint 10. Channels 15 can have a depth 19 of about 50–75% thickness of member 12 plus the thickness of member 11 (for example, depth 19 may be about 1", a width 20 that corresponds generally to the diameter of the stirring probe, and a length 21 that is smaller than the extent of overlap 22.

Figure 2:
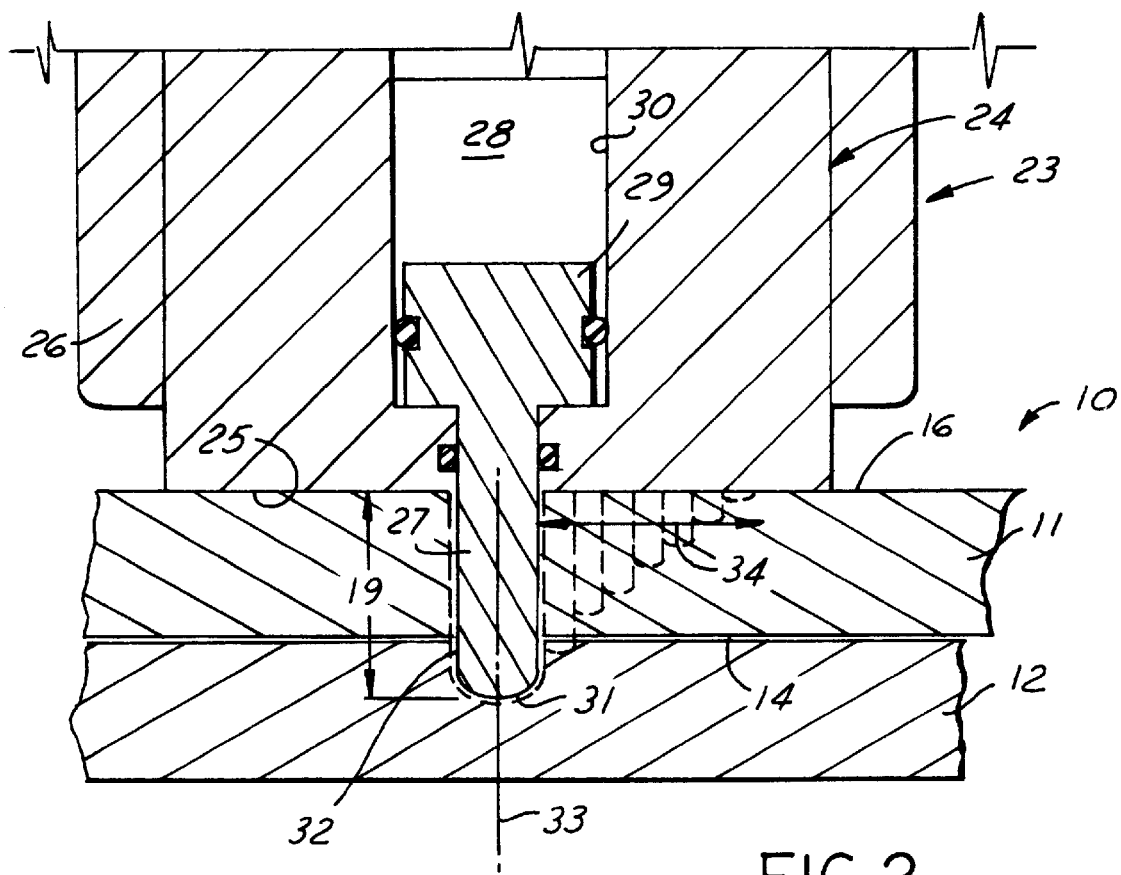
FIG. 2 is an enlarged sectional view of a lap joint showing the welding tool positioned for friction stir welding with the tool probe extended fully from the tool housing for achieving proper penetration and to obtain a weld that is strong in shear.

To construct a low distortion frame, the method herein first comprises providing a friction stir welding tool 23 (see FIG. 2) having a rotatable thermally conductive body 24 that presents a thermally conductive shoulder 25 to engage the exposed surface 16 of member 11 of the joint 10. The body 24 rotates within housing 26 and has a coaxially located pin or probe 27 that spins concurrently with the body 24, but is extendable out of the body 24 by application of pneumatic pressure 28 behind a piston 29 that is integrated to the pin 27. The piston 29 is sealingly slidable within a closed chamber 30. The shoulder 25 has a contour complementary to surface 16 to maintain a thermally conductive contact area that promotes thermal transfer therebetween. This generally requires orienting the rotatable axis 33 of the pin and body in a manner to be transverse or perpendicular to the interface 14.

The pin 27 has a rounded nose 31 to facilitate graduated spinning frictional contact with the flat exposed surface 16 and to promote plunging of the pin into the member's metal as it becomes plastic. The pin is preferably comprised of tool steel or other metal that is durable and harder than the metal of the members comprising the joint to be stir welded. Pin 27 is extendable out of body 24, as shown by dotted outline in FIG. 2, while shoulder 25 maintains spinning contact with member 11 as the metal of member 11, and eventually metal of member 12, becomes plastic in the immediate region 32 adjacent to the spinning pin. The pin 27 is extendable to an extent that penetrates the interface 14, which can require a pin extension 19 within a range of up to 1". The pin is applied with a downward pressure that allows the pin to penetrate to the shoulder of the pin (e.g., about 10,000 psi, depending on the diameter of the pin, and is rotated at a speed effective to generate frictional heat in the solid state that plasticizes the material of the joint thereby allowing the spinning of the probe to stir such plasticized material.

The spinning pin and shoulder is translated across the joint region to define the channel, and while doing so, frictionally stirs the plastically converted metal in the adjacent zone so that upon removal of the pin, the resulting channels of plastically converted metal will be present and occupy the path experienced by the pin with stirred metal that is devoid of porosity. The pin must be extended so that the resulting channel extends through the interface between the overlapping members to provide a welded joint that is exceptionally strong in shear.

Advantageously, the rate of translating linear movement 34 is about 50" per minute or within the range of 25–75"/ minute, while the rotating speed of the pin is about 1500 rpm, or within the range of 500–5000 rpm. The pin 27 and shoulder 25 may be optionally preheated to a temperature of about 550–750° F. by a suitable mechanism, not only to make it possible to penetrate and plunge through the thickness of two members of a lap weld that have been made locally plastic, but also to facilitate the rapidity of converting the workpiece metal to a plastic state. The plunge depth 19 required of lap welds may be in the range of 0.75–1.0", requiring a pin extension of 0.75 to 2". The depth of the penetration must be at least one-quarter inch beyond the interface, and more desirably, one-half to three-quarters of an inch beyond such interface, making penetration depth greater than that experienced by the prior art.

To enable the fabricating technique herein to work properly, the ratio of the surface contact area of shoulder 25 (with surface 16) to the diameter of the circular pin 27 should be desirably increased to the range of 7:1 to 4:1. The shoulder 25 should also be comprised of a metal that has a high thermal conductivity to quickly absorb and retain heat of the workpiece that is generated by the rotating friction of pin 27. In this manner, frictional heat is inhibited from rapidly spreading throughout the aluminum joint assembly.

Additionally, the ratio of the rate of translating movement of the tool to the rotational speed of the pin should advantageously be increased to the range of 8:1 to 5:1. This also assures that sufficient thickness will be generated to promote solid state plasticity of the aluminum members.

Figure 3:
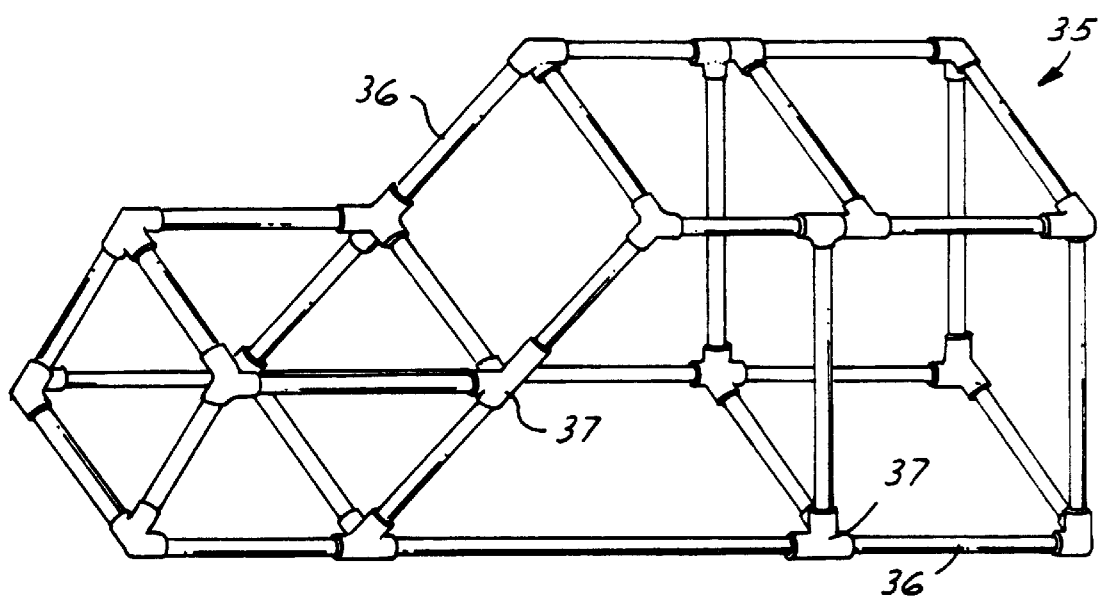
FIG. 3 is a perspective view of a space frame having struts connected by cast nodes at lap joints.
Figure 4:
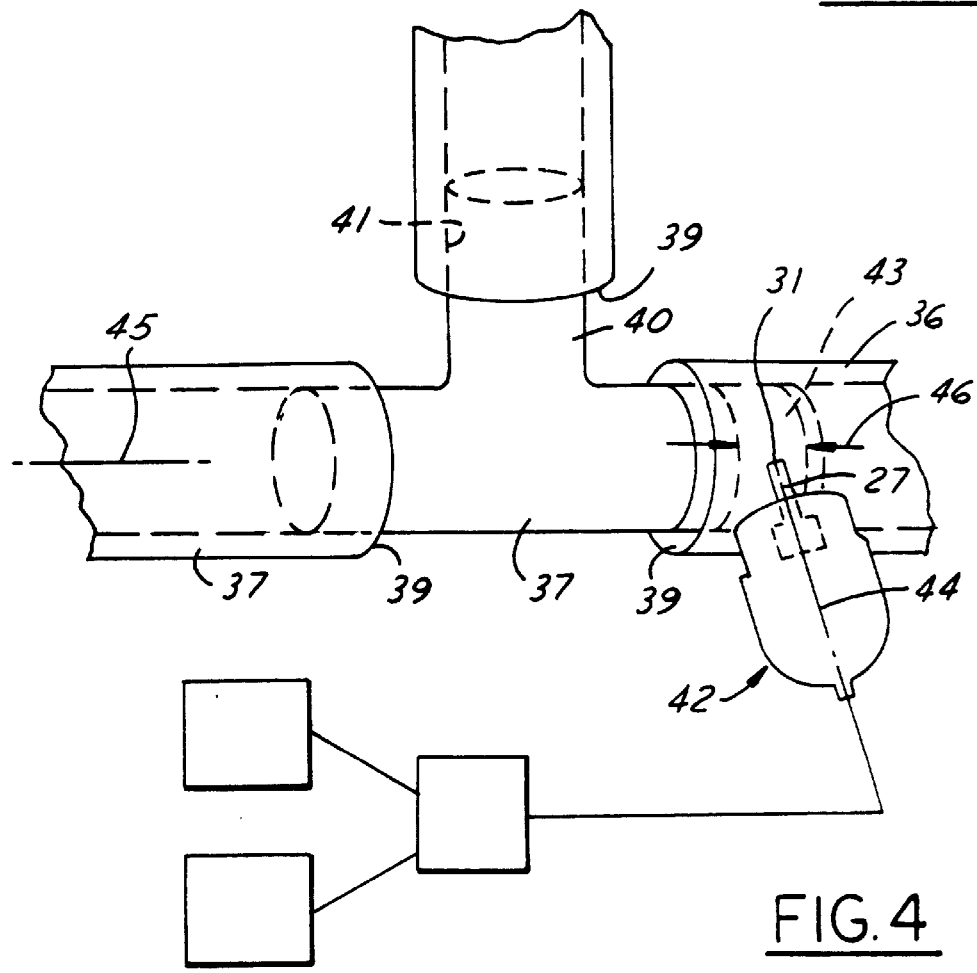
FIG. 4 is an enlarged view of a strut and node joint forming part of the space frame of FIG. 3 showing how friction stir welding is applied to such assembly.

Low distortion frames 35, such as shown in FIGS. 3–4, can be fabricated to be robust and have high weld strength in shear. The frame can serve as a space frame construction, useful as an automotive body frame, to which is stir friction welded thin aluminum sheet metal panels for completing the body; or the frame may serve as a seat frame or any structure which has overlapping components. Frame 35 is here comprised of extruded or hydroformed hollow aluminum struts 36 which are connected by cast aluminum nodes 37 designed to fix the struts in the desired spatial configuration. The use of the term "aluminum" herein is used to comprehend alloys of aluminum as well. Each end 39 of a strut is overlapped with a cast arm 40 of a node 37, creating a cylindrical or curved interface 41. The friction stirring tool 42, optionally heated to a temperature of 550–750° F. is placed adjacent the joint region 43 with the pin axis 44 transverse to the interface 41. With the body and pin spinning at a rotatable speed in the range of 1000–1800 rpm, the pin is progressively pushed into the outer surface of the tube end 39, with a pressure of about 10,000 psi depending on the pin diameter, to establish a friction generating contact. The adjacent local aluminum of the strut or tube 36 is quickly converted to a plastic solid state, allowing the pin to press further into the tube and successfully penetrate through the interface and reach the aluminum metal of the node 37. After such interface has been penetrated, the tool is translated in a direction along the axis 45 of the strut 37 to a length 46 that is within the lapped or joint region 43, creating a stirred channel of molten aluminum. At this point, the tool is removed and placed at another location of the joint region to perfect other stirred channels and complete the necessary welds for coupling the struts to the nodes.

Obviously, it is necessary that the cycle for stir welding be rapid to perfect so many weld channels in a complicated space frame structure as shown in FIG. 3. The fabricating technique of this invention allows the weld cycle to be as quick as 50" per minute, while promoting a weld joint that has a shear strength of at least 2,000 psi.

The workpiece metal is stirred behind the pin as it is translated and moved through the joint. This technique allows for an adhesive layer to be incorporated at the interface. Such adhesive will be in the path of the rotating pin and will be broken up and distributed in the weld channel as harmless particles. The adhesive can be self-curing or can be cured later after welding. The resulting adhesive/friction stir welded structure will have a shear strength of at least 3,000 psi; the adhesive assisted space frame, as a whole, will be exceptionally strong and have stiff joints with distortion as low as one-half that of conventionally arc-welded systems.

While the invention has been shown and described in its preferred embodiments, it will be clear to those skilled in the arts to which it pertains that many changes and modifications may be made thereto without departing from the scope of the invention.

What is claimed is:

1. A method of making a metallic, low distortion frame construction comprising:
   (a) assembling first and second overlapped members, which members can be stir welded at welding sites to form a frame construction requiring a stir-weldable thickness of up to one inch, said first members being comprised of extruded or hydroformed hollow aluminum struts and the second members being comprised of cast aluminum nodes;
   (b) providing a stir friction welding tool having
      (i) a rotatable thermally conductive body presenting a shoulder to engage the welding sites for storing friction generated heat, and
      (ii) a friction generating pin rotatable with said body about a pin axis and selectively extendable from the shoulder to progressively penetrate the overlapped members at the welding site to become stir welded;
   (c) pressing said tool shoulder against the welding site with a pressure of 7,500–15,000,12,500 psi and with the pin axis transverse to the overlapped members, and spinning said body while progressively extending the rotating pin at a rotational speed of 1000–1500 rpm effective to generate frictional heat, in the solid state, that penetrates both overlapped members, allowing the spinning of the pin to stir plastically converted material; and
   (d) controlling the depth of penetration of the spinning pin while translating the tool across the joint region to perfect a friction stir welded zone that extends through the interface and between the overlapping members to provide a welded joint that is exceptionally strong in shear.

2. The method of claim 1, in which in step (c) the pin axis is perpendicular to the contacted surface of the welding site during friction stirring and the translatory movement of the pin is along the direction of anticipated shear for the joint.

3. The method of claim 1, in which said pin and body each are preheated to a temperature of 550–750° F.

* * * * *